United States Patent
Masterson et al.

(10) Patent No.: US 10,379,702 B2
(45) Date of Patent: Aug. 13, 2019

(54) PROVIDING ATTACHMENT CONTROL TO MANAGE ATTACHMENTS IN CONVERSATION

(71) Applicant: Microsoft Technology Licensing, LLC, Redmond, WA (US)

(72) Inventors: Joey Masterson, Issaquah, WA (US); Kenneth Fern, Bellevue, WA (US); David Paul Limont, Redmond, WA (US); Hayley Steplyk, Cambridge, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 569 days.

(21) Appl. No.: 14/672,032

(22) Filed: Mar. 27, 2015

(65) Prior Publication Data
US 2016/0283051 A1 Sep. 29, 2016

(51) Int. Cl.
| | |
|---|---|
| *G06F 3/0482* | (2013.01) |
| *G06Q 10/10* | (2012.01) |
| *H04L 12/58* | (2006.01) |
| *G06F 3/0484* | (2013.01) |
| *G06F 3/0485* | (2013.01) |

(52) U.S. Cl.
CPC .......... *G06F 3/0482* (2013.01); *G06F 3/0485* (2013.01); *G06F 3/04842* (2013.01); *G06Q 10/107* (2013.01); *H04L 51/08* (2013.01)

(58) Field of Classification Search
CPC .... G06F 3/048; G06F 3/0482; G06F 3/04802; G06F 3/0485

See application file for complete search history.

(56) References Cited

U.S. PATENT DOCUMENTS

| | | |
|---|---|---|
| 5,983,364 A | 11/1999 | Bortcosh et al. |
| 6,807,643 B2 | 10/2004 | Eckardt et al. |
| 7,593,991 B2 | 9/2009 | Friedman et al. |
| 7,647,559 B2 | 1/2010 | Yozell-Epstein et al. |
| 8,140,905 B2 | 3/2012 | Beaty et al. |

(Continued)

FOREIGN PATENT DOCUMENTS

| | | |
|---|---|---|
| EP | 1643426 A2 | 4/2006 |
| EP | 1847949 B1 | 10/2007 |
| WO | 2011055013 A1 | 5/2011 |

OTHER PUBLICATIONS

"How can we improve Airmail", Retrieved on: Jan. 28, 2015 Available at: https://airmailapp.uservoice.com/forums/209001-airmail-mac-1-x/suggestions/3722190-make-attachments-accessible-from-conversation-mess.

(Continued)

*Primary Examiner* — Jeanette J Parker
(74) *Attorney, Agent, or Firm* — Michael Best & Friedrich LLP

(57) ABSTRACT

An attachment control to manage attachments in a conversation is provided. An application such as a communication application displays a conversation of grouped messages in response to a detection of a selection of a message summary associated with one of the grouped messages. An attachment control is generated to manage identified attachments in the grouped messages. The attachment control is displayed in proximity to the conversation. An attachment drop down menu that includes a listing of the attachments is displayed in response to an activation of the attachment control.

20 Claims, 8 Drawing Sheets

(56) References Cited

U.S. PATENT DOCUMENTS

| | | | |
|---|---|---|---|
| 8,185,591 B1 | 5/2012 | Lewis | |
| 8,239,853 B2 | 8/2012 | Lee | |
| 8,615,380 B2 | 12/2013 | Kim et al. | |
| 8,631,079 B2 | 1/2014 | Affronti et al. | |
| 8,701,046 B2 | 4/2014 | McCann et al. | |
| 8,725,818 B1 | 5/2014 | Covitz et al. | |
| 9,021,428 B2 | 4/2015 | Ajith Kumar et al. | |
| 9,483,886 B2 | 11/2016 | Bergerhoff et al. | |
| 2004/0068545 A1 | 4/2004 | Daniell et al. | |
| 2004/0225381 A1 | 11/2004 | Ritz et al. | |
| 2005/0015678 A1 | 1/2005 | Miller | |
| 2006/0168543 A1* | 7/2006 | Zaner-Godsey | G06Q 10/107 715/835 |
| 2006/0242286 A1 | 10/2006 | Hawkins et al. | |
| 2009/0013216 A1 | 1/2009 | Abrashkevich et al. | |
| 2009/0055684 A1 | 2/2009 | Jamjoom et al. | |
| 2009/0319618 A1* | 12/2009 | Affronti | G06Q 10/107 709/206 |
| 2010/0095224 A1* | 4/2010 | Yozell-Epstein | G06Q 10/107 715/752 |
| 2010/0229022 A1 | 9/2010 | Anand et al. | |
| 2012/0124147 A1* | 5/2012 | Hamlin | H04L 51/36 709/206 |
| 2012/0233227 A1* | 9/2012 | Alexander | G06F 17/30091 707/827 |
| 2012/0284639 A1 | 11/2012 | Yuniardi et al. | |
| 2012/0324503 A1 | 12/2012 | Kim | |
| 2013/0290442 A1* | 10/2013 | Dgani | G06Q 10/107 709/206 |
| 2014/0214988 A1 | 7/2014 | Nicolaou et al. | |
| 2014/0310222 A1 | 10/2014 | Davlos et al. | |
| 2015/0100895 A1* | 4/2015 | Parmar | H04L 51/10 715/752 |
| 2015/0148328 A1 | 5/2015 | El-ahmad et al. | |
| 2015/0161123 A1 | 6/2015 | Sterling et al. | |
| 2015/0161344 A1 | 6/2015 | Chung et al. | |
| 2015/0195182 A1 | 7/2015 | Mathur et al. | |
| 2016/0065511 A1* | 3/2016 | Ganin | H04L 51/063 709/206 |
| 2017/0286199 A1 | 10/2017 | Soini et al. | |
| 2018/0095814 A1 | 4/2018 | Patil et al. | |
| 2018/0095847 A1 | 4/2018 | Patil et al. | |

OTHER PUBLICATIONS

"New book: Microsoft Outlook 2010 Step by Step", Published on: Jul. 16, 2010 Available at: blogs.msdn.com/b/microsoft_press/archive/2010/07/16/new-book-microsoft-outlook-2010-step-by-step.aspx.

"Create a custom arrangement to sort by conversation in Microsoft Entourage", Published Date: Jul. 24, 2007 Available at: https://www.rit.edu/its/services/desktop_support/mac/entouragecustomviewbyconv.html.

"International Search Report and Written Opinion Issued in PCT Application No. PCT/US2016/023498", dated Jun. 10, 2016, 11 Pages.

"Non Final Office Action Issued in U.S. Appl. No. 15/283,276", dated May 31, 2018, 16 Pages.

"Non Final Office Action Issued in U.S. Appl. No. 15/283,234", dated Jul. 3, 2018, 12 Pages.

"Final Office Action Issued in U.S. Appl. No. 15/283,234", dated Nov. 15, 2018, 13 Pages.

"Vmware: Knowledge Base", Retrieved from: https://kb.vmware.com/selfservice/microsites/search.do?language=en_US&cmd=displayKC&externalId=2129384, Jun. 29, 2016, 2 Pages "IBM Knowledge Center", Retrieved from: https://www.ibm.com/support/knowledgecenter/POWER5/ipha5_p5/pha5kickoff.htm, Jun. 29, 2016, 1 Page.

"Notice of Allowance Issued in U.S. Appl. No. 15/283,234", dated Apr. 17, 2019, 6 Pages.

* cited by examiner

PROVIDING ATTACHMENT CONTROL TO MANAGE ATTACHMENTS IN CONVERSATION

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to complicated analysis tools. Many such applications display a message and attachments associated with the message through a display and enable users to provide input associated with the applications' operations.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to an attachment control to manage attachments in a conversation. In some example embodiments, a messaging application may detect a selection of a message summary displayed on a message summary pane. A conversation of grouped messages may be displayed on a message body user interface. The conversation may include one of the grouped messages associated with the selected message summary.

An attachment control may be generated to manage identified attachments of the grouped messages. The attachments may include listings of all attachments stored in the grouped messages (such as a conversation). The attachments may include media such as an audio, a video, a graphic, an image, or a combination of media, among others. The attachments may be stored in mailboxes associated with the grouped messages, or in a content provider, among others. The attachment control may be displayed in proximity to the conversation. In response to an activation of the attachment control, an attachment drop down menu may be displayed. The attachment drop down menu may include a listing of the attachments. The attachment control may also include a section that displays types of content associated with the attachments, links to media associated with the attachments and the grouped messages, or links to web pages associated with the attachments and the grouped messages, among others.

Alternate user interfaces may also be generated to manage identified attachments of the grouped messages. In an example scenario, an attachment user interface such as a panel may be generated with actions to manage the attachments of the grouped messages. The attachment user interface may be placed and operated in relation to the message body user interface. An example of placement of the attachment user interface may include a location in proximity to the message body user interface of the messaging application.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
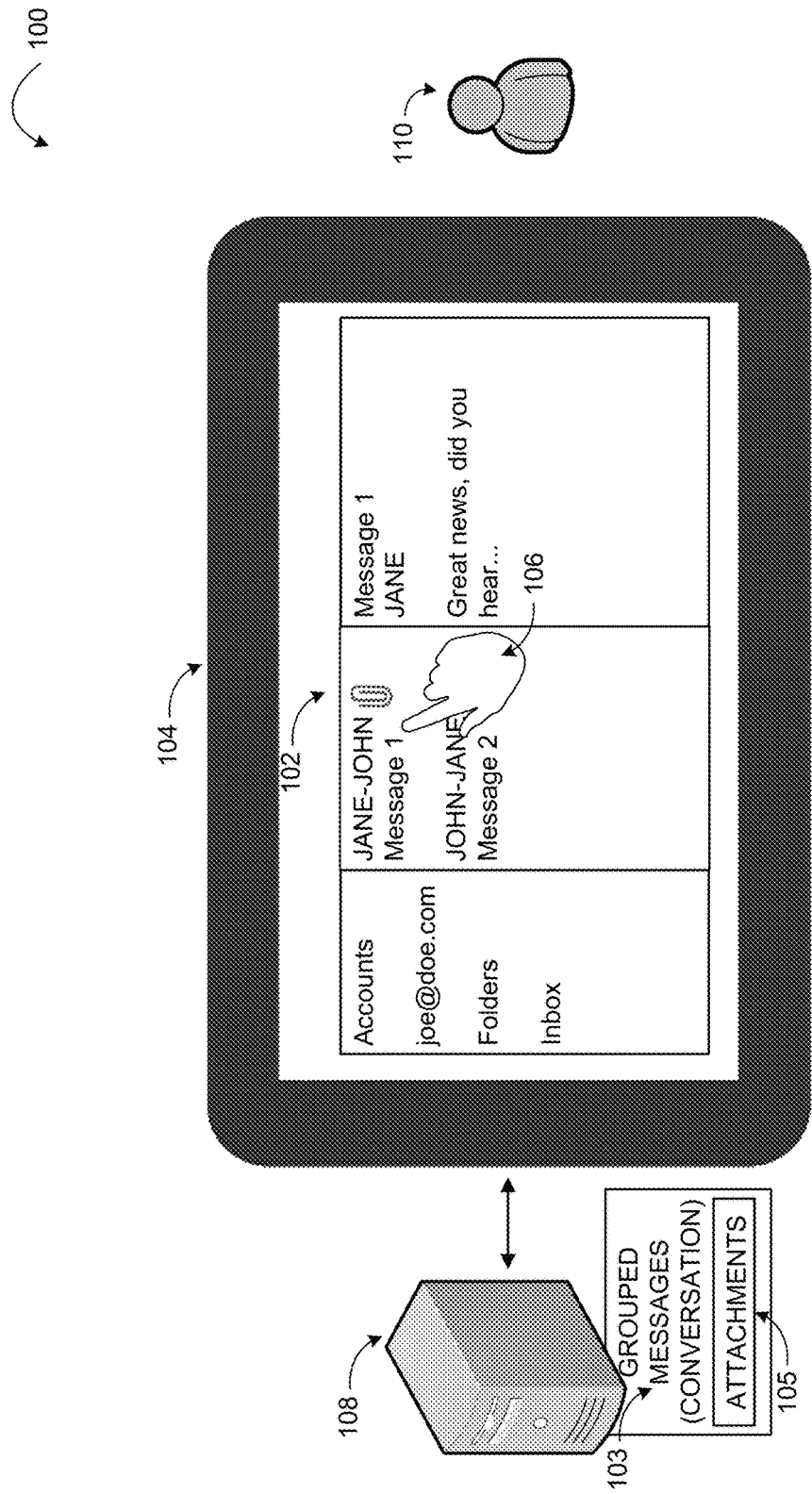
FIG. 1 is a conceptual diagram illustrating an example of providing an attachment control to manage attachments in a conversation, according to embodiments.

As briefly described above, an attachment control may be provided to manage attachments in a conversation by a messaging application. A conversation of grouped messages may be displayed in response to a detection of a selection of a message summary associated with one of the grouped messages. An attachment control may be generated from identified attachments of the grouped messages. The attachment control may be displayed in proximity to the conversation. In response to an activation of the attachment control, an attachment drop down menu that includes a listing of the attachments may be displayed.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable memory device includes a hardware device that includes a hard disk drive, a solid state drive, a compact disk, and a memory chip, among others. The computer-readable storage medium can for example be implemented via one or more of a volatile computer memory, a non-volatile memory, a hard drive, and a flash drive.

Throughout this specification, the term "platform" may be a combination of software and hardware components to provide an attachment control to manage attachments in a conversation. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 is a conceptual diagram illustrating an example of providing an attachment control to manage attachments in a conversation, according to embodiments.

In a diagram 100, a computing device 104 may execute a messaging application 102. The computing device 104 may include a tablet device, a laptop computer, a desktop computer, and a smart phone, among others. The computing device 104 may display the messaging application 102 to a user 110. The user 110 may be allowed to interact with the messaging application 102 through an input device or touch enabled display component of the computing device 104. The computing device 104 may include a display device such as the touch enabled display component, and a monitor, among others to provide a user interface of the messaging application 102 to the user 110.

The messaging application 102 may detect a selection of a message summary by a user 110 through a user action 106. A conversation of grouped messages may be displayed in which one of the messages is associated with the message summary. An attachment control may be generated from identified attachments of the grouped messages. The attachments may include listings of all attachments stored in the grouped messages (such as a conversation). The attachments may include media such as an audio, a video, a graphic, an image, or a combination of media, among others. The attachments may be stored in mailboxes associated with the grouped messages, or in a content provider, among others. The attachment control may be displayed in proximity to the conversation. In response to an activation of the attachment control, an attachment drop down menu may be displayed.

The attachment drop down menu may include a listing of the attachments. The attachment control may also include a section that displays types of content associated with the attachments, links to media associated with the attachments and the grouped messages, or links to web pages associated with the attachments and the grouped messages, among others.

Alternate user interfaces may also be generated to manage identified attachments of the grouped messages. In an example scenario, an attachment user interface such as a panel may be generated with actions to manage the attachments of the grouped messages. The attachment user interface may be placed and operated in relation to the message body user interface. An example of placement of the attachment user interface may include a location in proximity to the message body user interface of the messaging application. The attachment control and the panel are provided as examples of an attachment user interface in a non-limiting sense. Other user interfaces may be used to manage attachments of a grouped message such as a conversation, or a message, among others.

The user 110 may interact with the messaging application 102 with a keyboard based input, a mouse based input, a voice based input, a pen based input, and a gesture based input, among others. The gesture based input may include one or more touch based actions such as a touch action, a swipe action, and a combination of each, among others.

The messaging application 102 may retrieve the attachments in the conversation from a local source such as a storage media, a memory, a hard disk drive, and a solid state drive, among others that store the grouped messages of the conversation. The attachments may also be received from a message services provider such as the server 108 that provides the grouped messages. An example of a message services provider may include an email server, among others.

While the example system in FIG. 1 has been described with specific components including the computing device 104, the messaging application 102, embodiments are not limited to these components or system configurations and can be implemented with other system configuration employing fewer or additional components.

Figure 2:
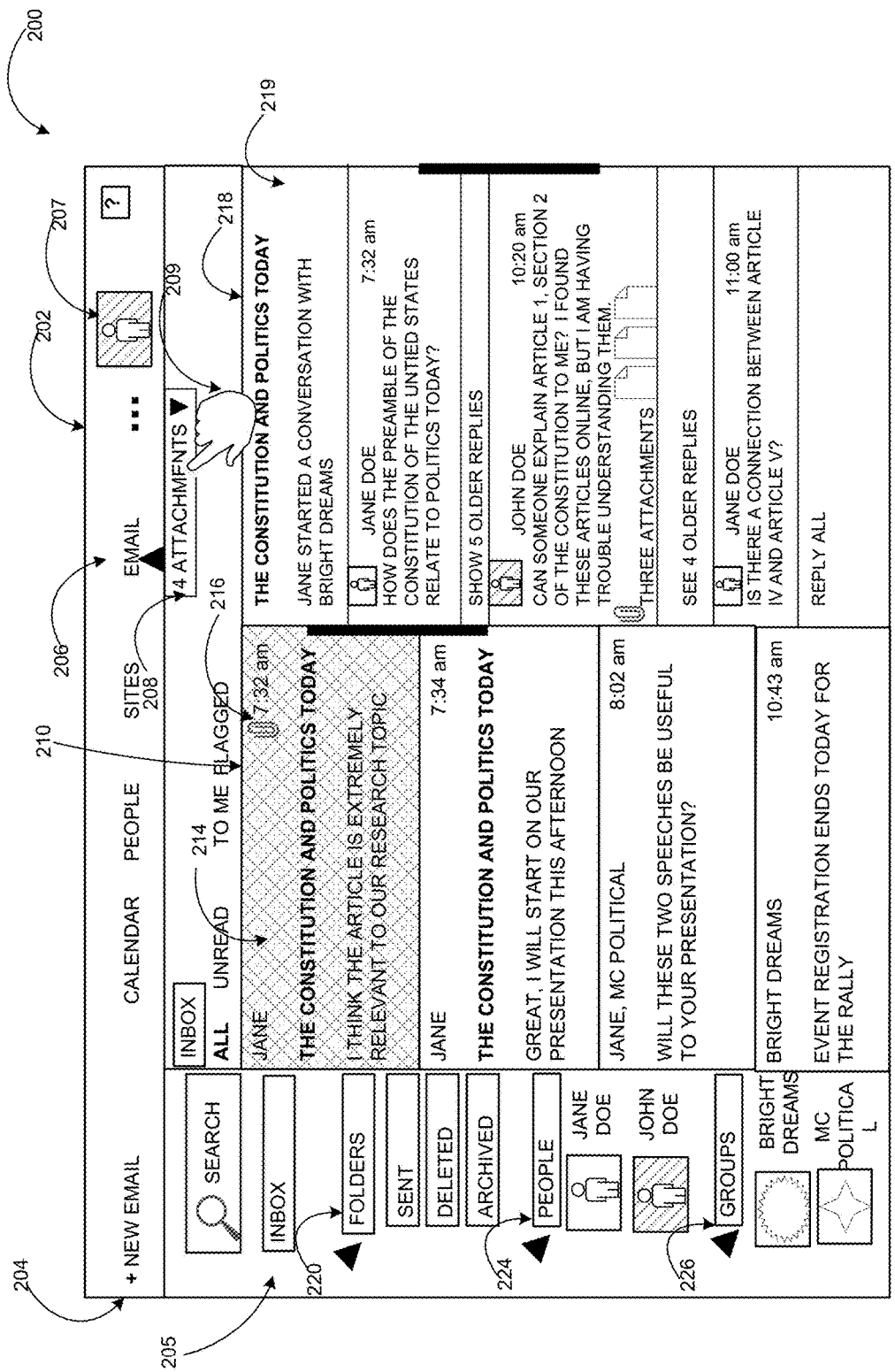
FIG. 2 illustrates an example of an attachment control provided to manage attachments in a conversation, according to embodiments.

FIG. 2 illustrates an example of an attachment control provided to manage attachments in a conversation, according to embodiments.

In a diagram 200, a messaging application 202 may display a user interface to display summary of messages and the messages. The user interface may include a menu pane 204 that includes controls to switch between communication user interfaces such as an email user interface 206, a calendar user interface, or a contacts user interface, among others. The menu pane 204 may also display a user control 207 that provides an operation to access attributes associated with a user account that receives the messages.

The messaging application 202 may also display a navigation pane 205 that provides controls to manage categories where the messages may be cataloged. A folders control 220 may include operations to provide additional controls, which correspond to folders such as "sent," "deleted," and "archived," among others in which the messages may be stored. A people control 224 may include operations to display summaries of messages based on a selected contact within a summary pane 210. A groups control 226 may include operations to display summaries of messages based on a selected group, within the summary pane 210.

The summary pane 210 may display summaries of messages. A message summary 214 may display identifying information such as a subject, a sender, and a sample text, among others of a corresponding message. The message summary 214 may also provide an attachment notification 216 to indicate that the message may include an attachment. The attachment may include an audio file, a video file, an image file, a text file, and an animation file, among others.

A message pane 218 may display a conversation 219 that includes a message associated with the message summary 212. The conversation 219 may also include messages that are related to the message associated with the message summary 212. In an example scenario, the conversation 219 may include messages that are replies to an initial message. The message 214 and the related messages in the conversation may be referred to as the grouped messages.

The messaging application 202 may detect a selection of the message summary 214 in response to a user action. The message summary 214 may be displayed with a status change indicator such as a highlighting to indicate a selected status. In response to the selection of the message summary 214, attachments may be identified within grouped messages in the conversation. An attachment control 208 may be generated from the identified attachments. The attachment control 208 may be displayed in proximity to the conversation 219. In an example scenario, the attachment control 208 may be displayed adjacent to and above the conversation 219.

An attachment drop down menu may be displayed in response to an activation 209 of the attachment control 208. The attachment control 208 may also display a number of the attachments identified in the conversation 219.

Figure 3:
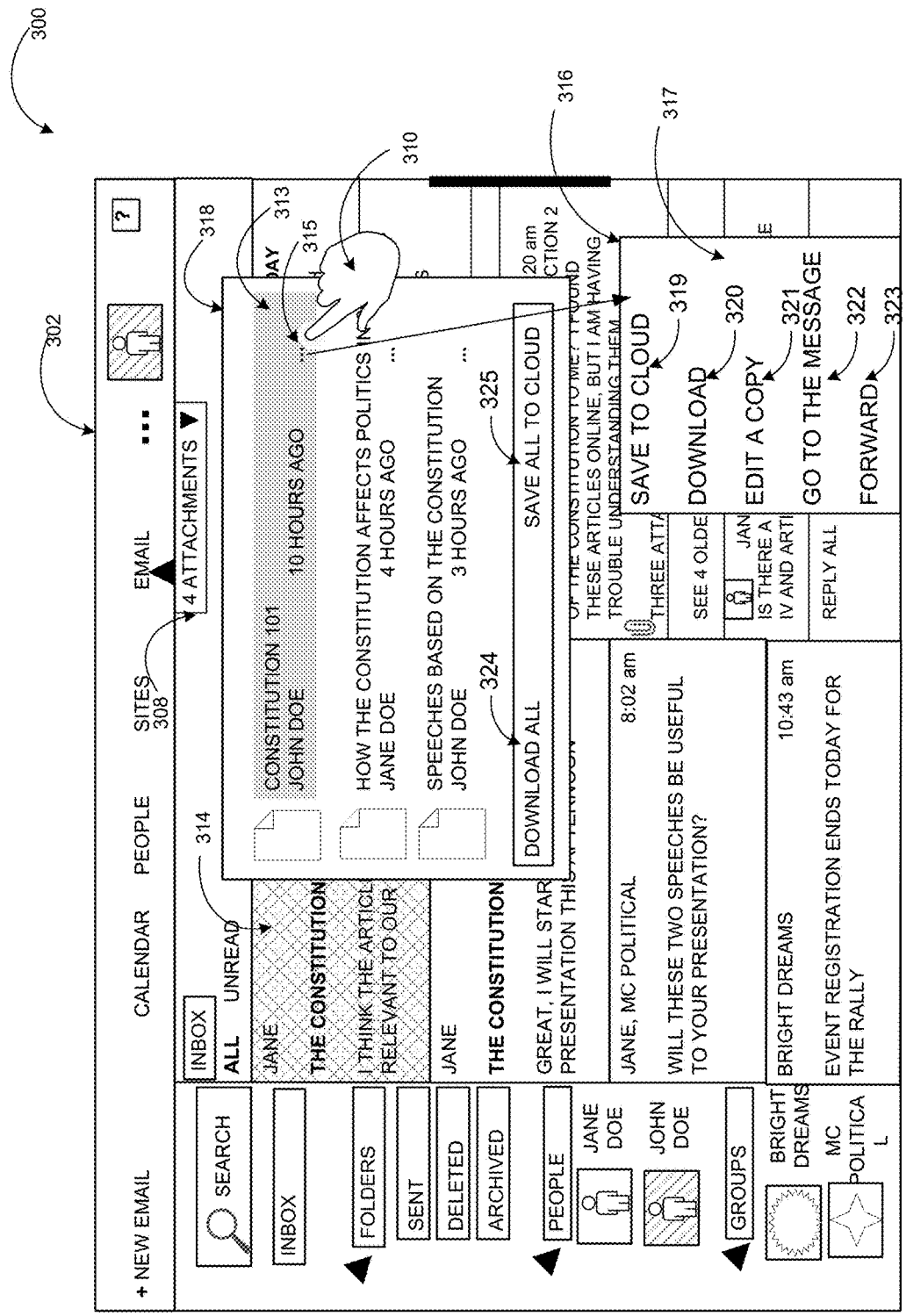
FIG. 3 illustrates an example of an attachment drop down menu and attachment controls provided to manage attachments in a conversation, according to embodiments.

FIG. 3 illustrates an example of an attachment drop down menu and attachment controls provided to manage attachments in a conversation, according to embodiments.

In a diagram 300, a messaging application 302 may provide an attachment control 308 to manage attachments identified in a conversation that includes grouped messages. In response to a selection of the attachment control 308, an attachment drop down menu 318 may be displayed. The attachment drop down menu 318 may include a listing of the attachments in the conversation. A subset of the attachments associated with a selected message may be positioned at a top section of the attachment drop down menu 318. The selected message within the conversation may correspond to a selected message summary 314 that is displayed on a message summary pane.

Ordering actions may be provided on the attachment drop down menu 318 to order the attachments based on attributes associated with the attachments. The attributes may include an attachment type, a received timestamp, an importance flag, a sender, a view frequency, and an editing frequency, among others associated with the attachment and a corresponding message.

The attachment drop down menu 318 may also provide a "download all" action 324. In response to a detection of a selection of the "download all" action 324, the attachments within the conversation may be saved to a local storage. The local storage may include a storage device directly accessible by the messaging application 302. The attachment drop down menu 318 may also provide a "save to cloud" action 325. In response to a detection of a selection of the "save to cloud" action 325, the attachments may be saved to a remote storage provided by a cloud-based service. The cloud-based service may be accessible to the messaging application 302 through a network connection.

The attachments in the attachment drop down menu 318 may be displayed with control menu actions located on a right section of the attachments. A subsequent selection 310 may be detected on a control menu action 315 of a selected attachment 313. In response to an activation of the control menu action 315, a control menu 316 may be displayed that includes attachment actions 317. The attachment actions 317 may include operations to manage the attachments. In an example scenario, in response to a detection of a "save to cloud" action 319 from the attachment actions 317, the selected attachment 313 may be saved to a remote storage provided by a cloud based service.

In another example scenario, the messaging application 302 may detect a selection of a download action 320 from the attachment actions 317. The selected attachment 313 may be saved to a local storage. Alternatively, a selection of an "edit a copy" action 321 from the attachment actions 317 may be detected. The selected attachment 313 may be displayed in an edit user interface to allow a user to edit the selected attachment 313.

In yet another example scenario, the messaging application 302 may detect a selection of a "go to the message" action 322. The conversation may be scrolled to one of the grouped messages associated with the selected attachment 313. Alternatively, the conversation may be scrolled to one of the grouped messages associated with the selected attachment 313 in response to a selection of a part of the message associated with the selected attachment 313. Additionally, a selection of a forward action 323 may be detected. In response to a selection of the forward action 323, the conversation may be replaced with a reply message that includes the selected attachment 313.

Figure 4:
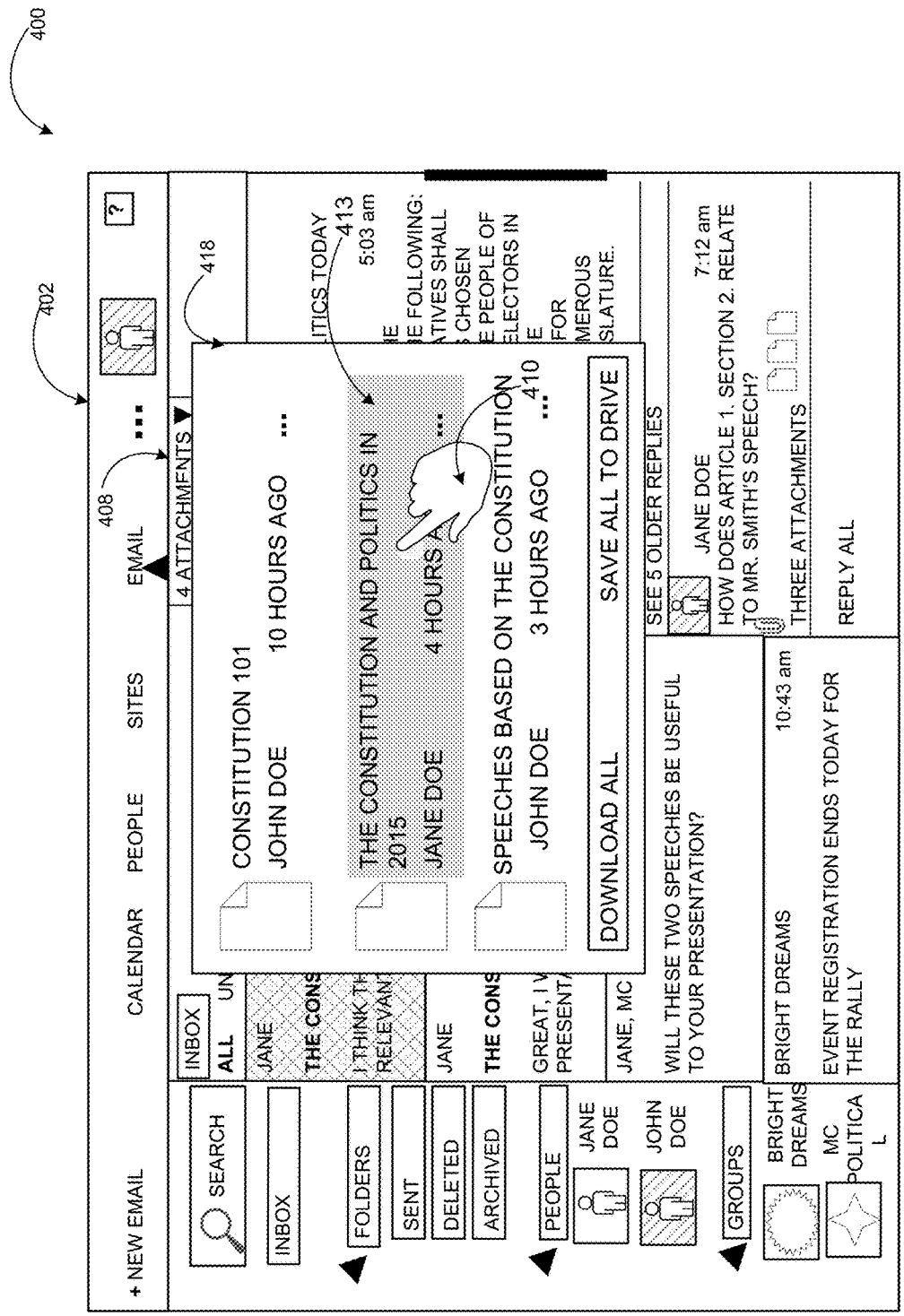
FIG. 4 illustrates an example of a selection action on the attachment drop down menu that activate a document presentation user interface, according to embodiments.

FIG. 4 illustrates an example of a selection action on the attachment drop down menu that activate a document presentation user interface, according to embodiments.

In a diagram 400, a messaging application 402 may display an attachment drop down menu 418 in response to a selection of an attachment control 408. An initial user action may select an attachment 413 from the attachments of the conversation displayed in the attachment drop down menu 418.

The messaging application 402 may detect an activation 410 of the selected attachment 413. The activation 410 may include an extended activation of the selected attachment 413. The extended activation may correspond to a sustained user action such as a tap-and-hold action or a click and hold action on the selected attachment 413. Alternatively, the activation 410 may include a double activation of the selected attachment 413. The double activation may correspond to a double tap action or a double click action on the selected attachment 413.

Figure 5:
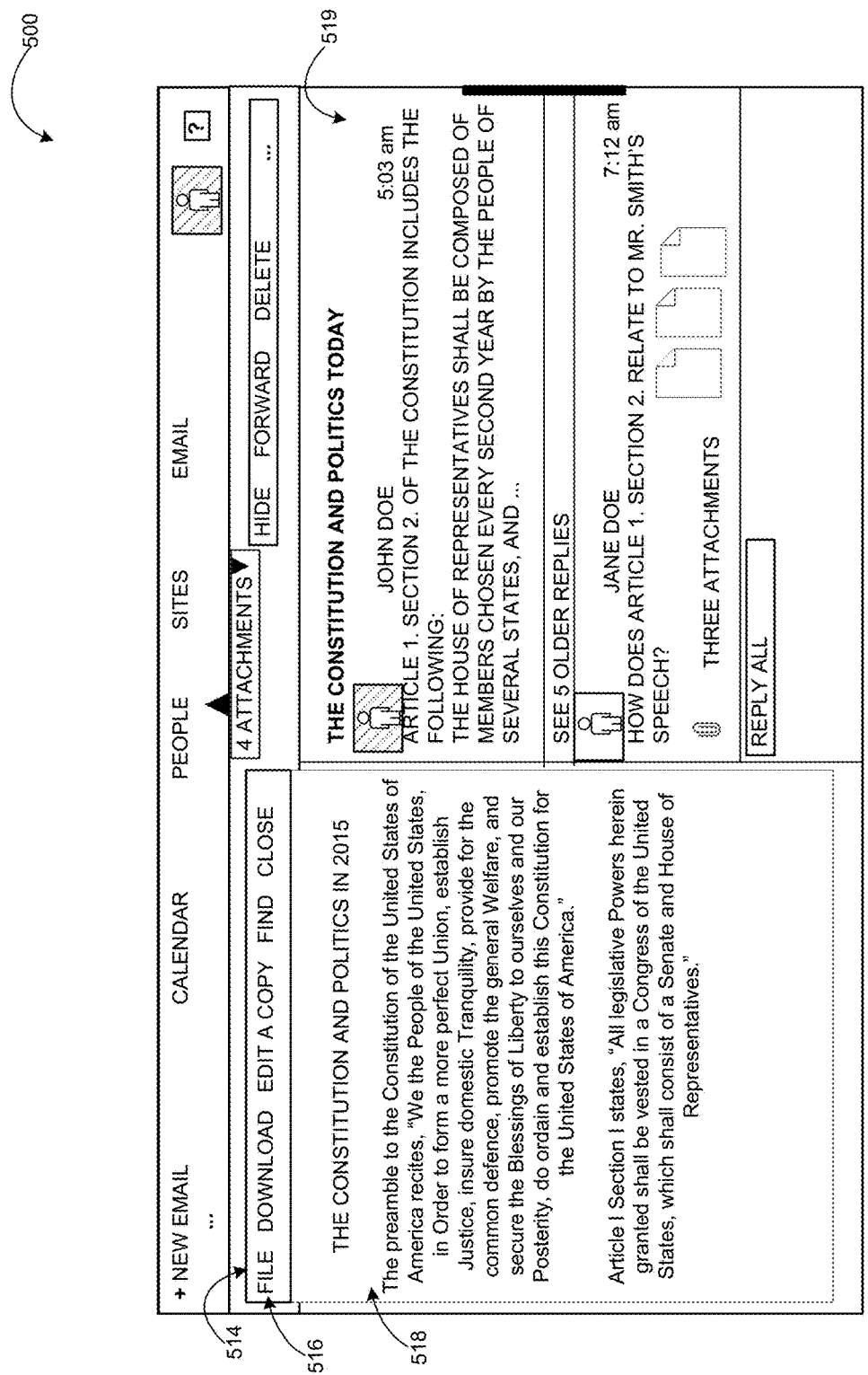
FIG. 5 illustrates an example of a document presentation user interface provided to allow editing of content of a selected attachment, according to embodiments.

FIG. 5 illustrates an example of a document presentation user interface provided to allow editing of content of a selected attachment, according to embodiments.

In a diagram 500, a messaging application 502 may display a document presentation interface 514 in response to an activation of a selected attachment provided through an attachment drop down menu of attachments within a conversation. The document presentation user interface 514 may display a content 518 of the selected attachment on the document presentation user interface 514.

The messaging application may also provide a document management menu 516 on the document presentation user interface 514. The document management menu 516 may include management actions to edit the content 518 of the selected attachment. The management actions may include font formatting actions, paragraph formatting actions, and save actions, among others.

The technical advantage of providing an attachment control to manage attachments in a conversation may include improved usability of user interfaces that present attachments of group of messages of a conversation. The attachment control may also allow a user to manage the attachments of the conversation through a simplified attachment management interface compared to legacy messaging solutions.

The example scenarios and schemas in FIG. 1 through 5 are shown with specific components, data types, and configurations. Embodiments are not limited to systems according to these example configurations. Providing an attachment control to manage attachments in a conversation may be implemented in configurations employing fewer or additional components in applications and user interfaces. Furthermore, the example schema and components shown in FIG. 1 through 5 and their subcomponents may be implemented in a similar manner with other values using the principles described herein.

Figure 6:
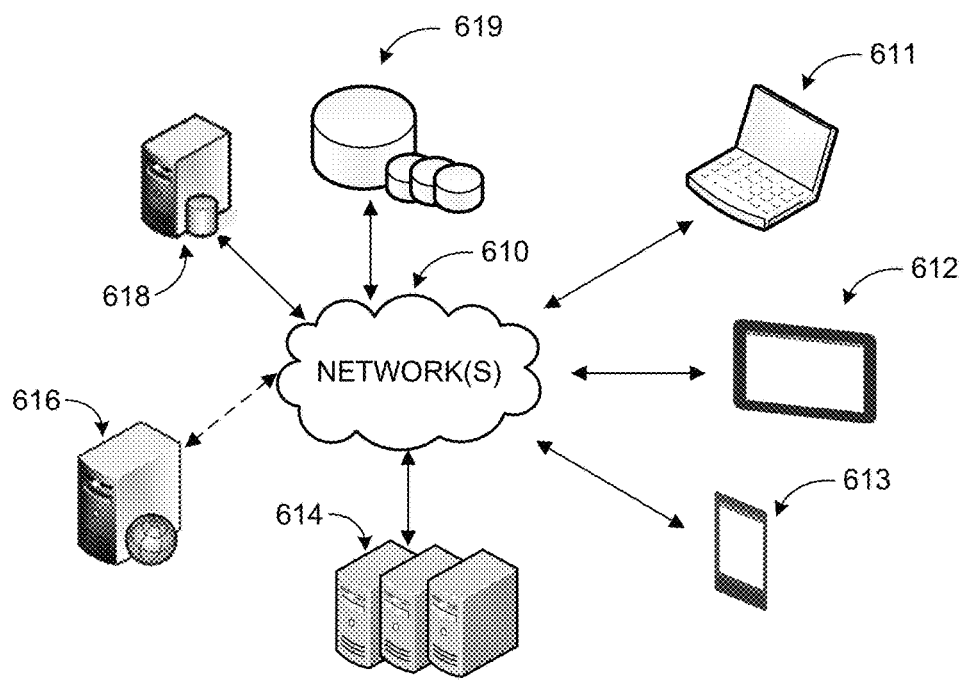
FIG. 6 is a simplified networked environment, where a system according to embodiments may be implemented.

FIG. 6 is an example networked environment, where embodiments may be implemented. A messaging application configured to provide an attachment control to manage attachments in a conversation may be implemented via software executed over one or more servers 614 such as a hosted service. The platform may communicate with client applications on individual computing devices such as a smart phone 613, a mobile computer 612, or desktop computer 611 ('client devices') through network(s) 610.

Client applications executed on any of the client devices 611-613 may facilitate communications via application(s) executed by servers 614, or on individual server 616. A messaging application may display a conversation of grouped messages in response to a detection of a selection of a message summary associated with one of the grouped messages. An attachment control to manage attachments in the conversation may be generated in response to an identification of the attachments in the grouped messages. In response to an activation of the attachment control, an attachment drop down menu may be displayed. The attachment drop down menu may include a listing of the attachments. The messaging application may store data associated with attachments in data store(s) 619 directly or through database server 618.

Network(s) 610 may comprise any topology of servers, clients, Internet service providers, and communication media. A system according to embodiments may have a static or dynamic topology. Network(s) 610 may include secure networks such as an enterprise network, an unsecure network such as a wireless open network, or the Internet. Network(s) 610 may also coordinate communication over other networks such as Public Switched Telephone Network (PSTN) or cellular networks. Furthermore, network(s) 610 may include short range wireless networks such as Bluetooth or similar ones. Network(s) 610 provide communication between the nodes described herein. By way of example, and not limitation, network(s) 610 may include wireless media such as acoustic, RF, infrared and other wireless media.

Many other configurations of computing devices, applications, data sources, and data distribution systems may be employed to provide an attachment control to manage attachments in a conversation. Furthermore, the networked environments discussed in FIG. 6 are for illustration purposes only. Embodiments are not limited to the example applications, modules, or processes.

Figure 7:
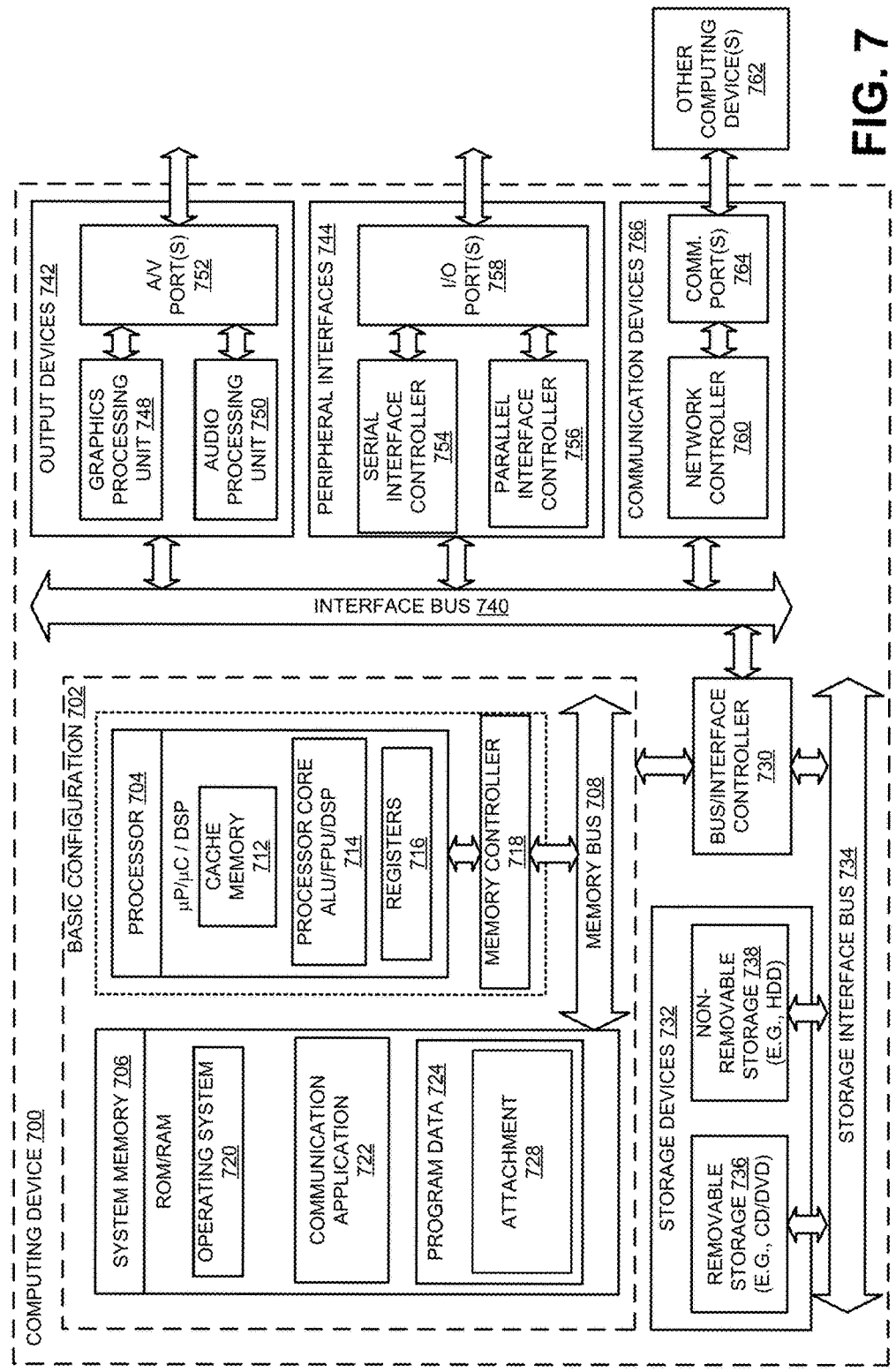
FIG. 7 illustrates a general purpose computing device, which may be configured to provide an attachment control to manage attachments in a conversation.

FIG. 7 illustrates a general purpose computing device, which may be configured to provide an attachment control to manage attachments in a conversation, arranged in accordance with at least some embodiments described herein.

For example, the computing device 700 may be used to provide an attachment control to manage attachments in a conversation. In an example of a basic configuration 702, the computing device 700 may include one or more processors 704 and a system memory 706. A memory bus 708 may be used for communication between the processor 704 and the system memory 706. The basic configuration 702 may be illustrated in FIG. 7 by those components within the inner dashed line.

Depending on the desired configuration, the processor 704 may be of any type, including, but not limited to, a microprocessor (μP), a microcontroller (μC), a digital signal processor (DSP), or any combination thereof. The processor 704 may include one more levels of caching, such as a level cache memory 712, a processor core 714, and registers 716. The processor core 714 may include an arithmetic logic unit (ALU), a floating point unit (FPU), a digital signal processing core (DSP Core), or any combination thereof. A memory controller 718 may also be used with the processor 704, or in some implementations, the memory controller 718 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a messaging application 722, and a program data 724. The messaging application 722 may display a conversation of grouped messages in response to a detection of a selection of a message summary associated with one of the grouped messages. An attachment control to manage attachments in the conversation may be generated in response to an identification of the attachments in the grouped messages. In response to an activation of the attachment control, an attachment drop down menu may be displayed. The attachment drop down menu may include a listing of the attachments. Components of the messaging application 722 (such as a user interface) may also be displayed on a display device associated with the computing device 700. An example of the display device may include a hardware screen that may be communicatively coupled to the computing device 700. The display device may include a touch based device that detects gestures such as a touch action. The display device may also provide feedback in response to detected gestures (or any other form of input) by transforming a user interface of the messaging application 722, displayed by the touch based device. The program data 724 may also include, among other data, attachment 728, or the like, as described herein. The attachment 728 may include an audio file, a video file, an image file, a text file, and an animation file, among others.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736, and the non-removable storage devices 738 may be examples of computer storage media. Computer storage media may include, but may not be limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 766) to the basic configuration 702 via the bus/interface controller 730. Some of the example output devices 742 may include a graphics processing unit 748 and an audio processing unit 750, which may be configured to communicate to various external devices, such as a display or speakers via one or more A/V ports 752. One or more example peripheral interfaces 744 may include a serial interface controller 754 or a parallel interface controller 756, which may be configured to communicate with external devices, such as input devices (for example, keyboard, mouse, pen, voice input device, touch input device, etc.) or other peripheral devices (for example, printer, scanner, etc.) via one or more I/O ports 758. An example communication device 766 may include a network controller 760, which may be arranged to facilitate communications with one or more other computing devices 762 over a network communication link via one or more communication ports 764. The one or more other computing devices 762 may include servers, client equipment, and comparable devices.

The network communication link may be one example of a communication media. Communication media may be embodied by computer-readable instructions, data structures, program modules, or other data in a modulated data signal, such as a carrier wave or other transport mechanism, and may include any information delivery media. A "modulated data signal" may be a signal that has one or more of the modulated data signal characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term computer-readable media, as used herein, may include both storage media and communication media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods to provide an attachment control to manage attachments in a conversation. These methods may be implemented in any number of ways, including the structures described herein. One such way may be by machine operations, using devices of the type described in the present disclosure. Another optional way may be for one or more of the individual operations of the methods to be performed in conjunction with one or more human operators performing some of the operations while other operations may be performed by machines. These human operators need not be co-located with each other, but each may be with a machine that performs a portion of the program. In other examples, the human interaction may be automated such as by pre-selected criteria that may be machine automated.

Figure 8:
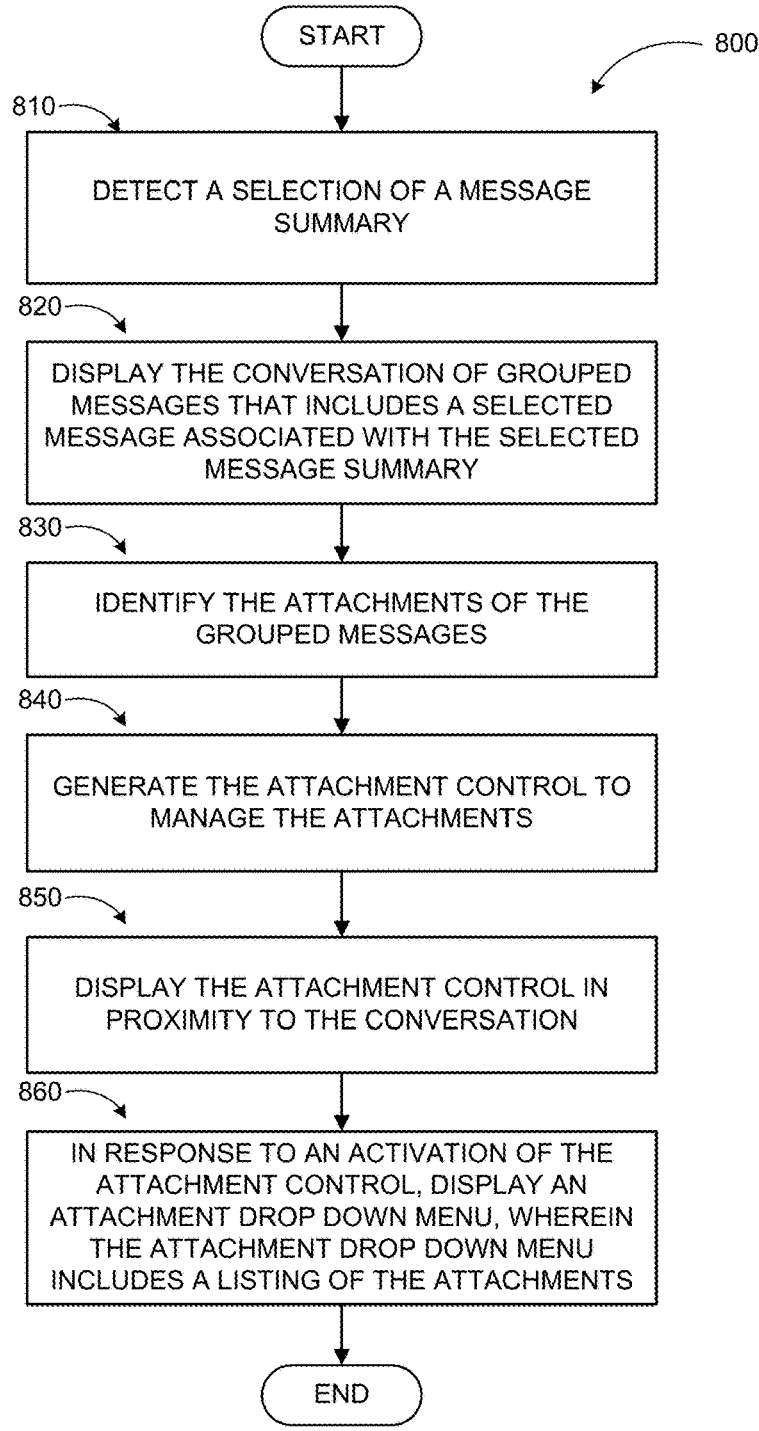
FIG. 8 illustrates a logic flow diagram for a process to provide an attachment control to manage attachments in a conversation, according to embodiments.

FIG. 8 illustrates a logic flow diagram for a process to provide an attachment control to manage attachments in a conversation, according to embodiments. Process 800 may be implemented on a messaging application.

Process 800 begins with operation 810, where a selection of a message summary may be detected. A conversation of grouped messages may be displayed at operation 820. The grouped messages may include a selected message associated with the selected message summary. Attachments of the grouped messages may be identified at operation 830. An attachment control to manage the attachments may be generated at operation 840. At operation 850, the attachment control may be displayed in proximity to the conversation. In response to an activation of the attachment control, an attachment drop down menu may be displayed at operation 860. The attachment drop down menu may include a listing of the attachments.

The operations included in process 800 are for illustration purposes. A messaging application according to embodiments may be implemented by similar processes with fewer or additional steps, as well as in different order of operations using the principles described herein.

According to some examples, a computing device to provide an attachment control to manage attachments in a conversation may be described. The computing device may include a display device, a memory, and a processor coupled to the memory and the display device. The processor may execute a messaging application. The messaging application may be configured to detect a selection of a message summary, display, on the display device, the conversation of grouped messages that includes a selected message associated with the selected message summary, identify attachments of the grouped messages, generate the attachment control to manage the attachments, display the attachment control in proximity to the conversation, and in response to an activation of the attachment control, display an attachment drop down menu, where the attachment drop down menu includes a listing of the attachments.

According to further examples, the messaging application may be further configured to display a number of the attachments of the grouped messages on the attachment control. The attachment control adjacent may be displayed to the conversation. A subset of the attachments associated with the selected message may be positioned on a top section of the attachment drop down menu.

According to other examples, the messaging application may be further configured to detect a selection of one of the attachments in the attachment drop down menu and display a control menu that includes actions to be performed on the selected attachment. The messaging application may be further configured to detect a selection of a "save to cloud" action from the control menu and save the selected attachment to a remote storage provided by a cloud-based service. The messaging application may be further configured to detect a selection of a download action from the control menu and save the selected attachment to a local storage. The messaging application may be further configured to detect a selection of an "edit a copy" action from the control menu and display the selected attachment in an edit user interface to allow a user to edit the selected attachment. The messaging application may be further configured to detect a selection of a "go to the message" action from the control menu and scroll the conversation to one of the grouped messages associated with the selected attachment. The messaging application may be further configured to detect a selection of a forward action from the control menu and generate a message that includes the selected attachment. The messaging application may be further configured to provide one or more ordering actions on the attachment drop down menu to order the attachments based on attributes associated with the attachments that include one or more of: an attachment type, a received timestamp, an importance flag, a sender, a view frequency, and an edit frequency.

According to some examples, a method that is executed on a computing device to provide an attachment control to manage attachments in a conversation may be described. The method may include detecting a selection of a message summary, displaying the conversation of grouped messages that includes a selected message associated with the selected message summary, identifying attachments of the grouped messages, generating the attachment control to manage the attachments, displaying the attachment control adjacent to the conversation, and in response to an activation of the attachment control, displaying an attachment drop down menu, where the attachment drop down menu includes a listing of the attachments.

According to other examples, the method may further include detecting a selection of a "download all" action on the attachment drop down menu and saving the attachments to a local storage. The method may further include detecting a selection of a "save all to cloud" action on the attachment drop down menu and saving the attachments to a remote storage provided by a cloud-based service. The method may further include detecting a selection of one of the attachments in the attachment drop down menu, where the selection is detected as one of: a tap and hold input, a click and hold input, a double tap input, and a double click input, displaying the content of the selected attachment on a document presentation user interface, where the document presentation user interface is presented adjacent to a communication application user interface that displays the conversation, and providing a document management menu on the document presentation user interface, where the document management menu includes management actions to allow a user to edit the content of the selected attachment.

According to some examples, a computer-readable memory device with instructions stored thereon to provide an attachment control to manage attachments in a conversation may be described. The instructions may include actions that are similar to method described above.

According to some examples, a means to provide an attachment control to manage attachments in a conversation may be described. The means to provide an attachment control to manage attachments in a conversation may include a means to detect a selection of a message summary, a means to display, on the display device, the conversation of grouped messages that includes a selected message associated with the selected message summary, a means to identify attachments of the grouped messages, a means to generate the attachment control to manage the attachments, a means to display the attachment control in proximity to the conversation, and a means to display an attachment drop down menu, where the attachment drop down menu includes a listing of the attachments in response to an activation of the attachment control.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide an attachment control to manage attachments in a conversation, the computing device comprising:
   a memory;
   a processor coupled to the memory, the processor executing a messaging application in conjunction with instructions stored in the memory, wherein the messaging application is configured to:
      display, on a summary pane message summaries for a group of messages that are part of the conversation, wherein two or more messages within the group of messages include one or more attachments;
      in response to detecting a selection of a message within the group of message through a selection of a corresponding message summary within the message summaries, identify one or more attachments included in the selected message;
      display an attachment control to manage the attachments included in messages within the group of messages;
      in response to the selection of the message within the group of messages and an activation of the attachment control through a user selection of the attachment control, display an attachment drop down menu, wherein
         the attachment drop down menu includes a listing of the attachments included in the two or more messages within the group of messages,
         a first attachment in the displayed listing of attachments is included in the selected message, and
         a last attachment in the displayed listing of the attachments is included in another message of the two or more messages.

2. The computing device of claim 1, wherein the messaging application is further configured to:
   display a number of the attachments of the group of messages on the attachment control.

3. The computing device of claim 1, wherein the messaging application is further configured to:
   display the attachment control adjacent to the conversation.

4. The computing device of claim 1, wherein the messaging application is further configured to:
   detect a selection of one of the attachments in the attachment drop down menu; and
   display a control menu that includes actions to be performed on the selected attachment.

5. The computing device of claim 4, wherein the messaging application is further configured to:
   detect a selection of an action to save the selected attachment to a remote storage from the control menu; and
   save the selected attachment to the remote storage.

6. The computing device of claim 4, wherein the messaging application is further configured to:
  detect a selection of a download action from the control menu; and
  save the selected attachment to a local storage.

7. The computing device of claim 4, wherein the messaging application is further configured to:
  detect a selection of an action to edit a copy of the selected attachment from the control menu; and
  display the selected attachment in an edit user interface to allow a user to edit the selected attachment.

8. The computing device of claim 4, wherein the messaging application is further configured to:
  detect a selection of an action to go to one of the group of messages of the selected attachment from the control menu; and
  scroll the conversation to one of the group of messages associated with the selected attachment.

9. The computing device of claim 4, wherein the messaging application is further configured to:
  detect a selection of a forward action from the control menu; and
  generate a message that includes the selected attachment.

10. The computing device of claim 1, wherein the messaging application is further configured to:
  provide one or more ordering controls on the attachment drop down menu to order the attachments based on attributes associated with the attachments that include one or more of: an attachment type, a received timestamp, an importance flag, a sender, a view frequency, and an edit frequency.

11. A method executed on a computing device to provide an attachment control to manage attachments in a conversation, the method comprising:
  displaying, on a summary pane, message summaries for a group of messages that are part of the conversation, wherein two or more messages within the group of messages include one or more attachments;
  in response to detecting a selection of a message within the group of messages through a selection of a corresponding message summary within the message summaries, identifying one or more attachments included in the selected message;
  displaying an attachment control to manage the attachments included in messages within the group of messages;
  in response to the selection of the message within the group of messages and an activation of the attachment control through user selection of the attachment control, displaying an attachment drop down menu, wherein
    the attachment drop down menu includes a listing of the attachments included in the two or more messages within the group of messages,
    a first attachment in the displayed listing of attachments is included in the selected message, and
    a last attachment in the displayed listing of attachments is included in another of the two or more messages.

12. The method of claim 11, further comprising:
  detecting a selection of an action to download all the attachments on the attachment drop down menu; and
  saving the attachments to a local storage.

13. The method of claim 11, further comprising:
  detecting a selection of an action to save the attachments to a remote storage on the attachment drop down menu; and
  saving the attachments to the remote storage.

14. The method of claim 11, further comprising:
  detecting a selection of one of the attachments in the attachment drop down menu, wherein the selection is detected as one of: a tap and hold input, a click and hold input, a double tap input, and a double click input.

15. The method of claim 14, further comprising:
  displaying a content of the selected attachment on a document presentation user interface, wherein the document presentation user interface is presented adjacent to a communication application user interface that displays the conversation.

16. The method of claim 15, further comprising:
  providing a document management menu on the document presentation user interface, wherein the document management menu includes management actions to allow a user to edit the content of the selected attachment.

17. A hardware computer-readable memory device with instructions stored thereon to provide an attachment control to manage attachments in a conversation, the instructions comprising:
  displaying, on a summary pane, message summaries for a group of messages that are part of the conversation, wherein two or more messages within the group of messages include one or more attachments;
  in response to detecting a selection of a message within the group of messages through a selection of a corresponding message summary within the message summaries, identifying attachments included in the selected message;
  displaying an attachment control to manage the attachments included in messages within the group of messages;
  in response to the selection of the message within the group of messages and an activation of the attachment control through a user selection of the attachment control, displaying an attachment drop down menu, wherein
    the attachment drop down menu includes a listing of the attachments included in the two or more messages within the group of messages,
    a first attachment in the displayed listing of attachments is included in the selected message, and
    a last attachment in the displayed listing of the attachments is included in another message of the two or more messages.

18. The hardware computer-readable memory device of claim 17, wherein the instructions further comprise:
  detecting a selection of one of the attachments in the attachment drop down menu;
  displaying a control menu that includes actions to be performed on the selected attachment;
  detecting a selection of an action to edit a copy of the selected attachment from the control menu; and
  displaying the selected attachment in an edit user interface to allow a user to edit the selected attachment.

19. The hardware computer-readable memory device of claim 17, wherein the instructions further comprise:
  detecting a selection of one of the attachments in the attachment drop down menu,
  wherein the selection is detected as one of: a tap and hold input, a click and hold input, a double tap input, and a double click input;
  displaying a content of the selected attachment on a document presentation user interface, wherein the document presentation user interface is presented adjacent to a communication application user interface that displays the conversation; and providing a document management menu on the document presentation user interface, wherein the document management menu includes management actions to allow a user to edit the content of the selected attachment.

20. The computing device of claim 1, wherein the messaging application is further configured to:

in response to selection of a second message within the group of messages, display the attachment drop down menu wherein the first attachment in the displayed listing of attachments is included in the second message.

* * * * *